United States Patent
Crowther et al.

(10) Patent No.: US 9,317,308 B2
(45) Date of Patent: Apr. 19, 2016

(54) AUGMENTING PROFILE DATA WITH INFORMATION GATHERED FROM A JIT COMPILER

(71) Applicant: International Business Machines Corporation, Armonk, NY (US)

(72) Inventors: Fiona M. Crowther, Oldgam (GB); Geza Geleji, Eastleigh (GB); Christopher J. Poole, Romsey (GB); Martin A. Ross, Gorport (GB); Craig H. Stirling, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/631,904

(22) Filed: Feb. 26, 2015

(65) Prior Publication Data

US 2015/0309815 A1     Oct. 29, 2015

(30) Foreign Application Priority Data

Apr. 25, 2014    (GB) .................................. 1407306.8

(51) Int. Cl.
    *G06F 9/45*        (2006.01)
    *G06F 9/455*      (2006.01)

(52) U.S. Cl.
    CPC .......... *G06F 9/45516* (2013.01); *G06F 8/4443* (2013.01)

(58) Field of Classification Search
    CPC ........................... G06F 8/4443; G06F 9/45516
    USPC ................................................. 717/140–161
    See application file for complete search history.

(56) References Cited

U.S. PATENT DOCUMENTS

| 7,765,527 | B2 | | 7/2010 | Burka et al. | |
| 7,770,163 | B2 | * | 8/2010 | Stoodley et al. | .............. 717/158 |
| 8,122,441 | B2 | * | 2/2012 | Barsness et al. | .............. 717/146 |
| 8,214,814 | B2 | * | 7/2012 | Barsness et al. | .............. 717/151 |
| 8,701,097 | B2 | * | 4/2014 | Doyle et al. | .................. 717/151 |

(Continued)

FOREIGN PATENT DOCUMENTS

WO        2013036703 A2     3/2013

OTHER PUBLICATIONS

Crowther et al., United Kingdom Patent Application 1407306.8, "Augmenting Profile Data With Information Gathered From a JIT Compiler", filed Apr. 25, 2014.

(Continued)

*Primary Examiner* — Qing Chen
(74) *Attorney, Agent, or Firm* — Steven F. McDaniel

(57) ABSTRACT

A method, executed by a computer, for augmenting a first performance profile with data extracted from a Just-in-Time compiler, the Just-in-Time compiler compiling bytecodes into machine instructions and generating the first performance profile, the bytecodes having an associated original call structure includes: tracking "in-lining" optimizations performed by a Just-in-Time compiler compiling bytecodes into machine instructions; extracting data associated with the tracked "in-lining" optimizations; storing the extracted data in a second profile; and augmenting the first performance profile with the extracted data associated with the tracked "in-lining" optimizations, the extracted data comprising call paths corresponding to the original call structure associated with the bytecodes. A corresponding computer program product and computer system are also disclosed herein.

18 Claims, 4 Drawing Sheets

(56) References Cited

U.S. PATENT DOCUMENTS

| | | |
|---|---|---|
| 8,782,623 B2 * | 7/2014 | Inglis et al. .................. 717/148 |
| 8,819,649 B2 * | 8/2014 | Lafreniere et al. ............ 717/139 |
| 2007/0226683 A1 * | 9/2007 | Stoodley et al. ............. 717/106 |
| 2009/0320003 A1 * | 12/2009 | Barsness et al. ............. 717/146 |
| 2009/0320008 A1 * | 12/2009 | Barsness et al. ............. 717/151 |
| 2012/0054725 A1 * | 3/2012 | Inglis et al. .................. 717/148 |
| 2012/0096447 A1 | 4/2012 | Inglis et al. |
| 2012/0117549 A1 * | 5/2012 | Doyle et al. ................. 717/147 |
| 2013/0067441 A1 * | 3/2013 | Lafreniere et al. ............ 717/139 |
| 2013/0205282 A1 | 8/2013 | Lafreniere et al. |
| 2013/0247018 A1 | 9/2013 | Chapman et al. |

OTHER PUBLICATIONS

"Buffered profiling approach for dynamically compiled code", Authors et al.: Disclosed Anonymously, An IP.com Prior Art Database Technical Disclosure, IP.com No. 000214172, IP.com Electronic Publication: Jan. 13, 2012, pp. 1-3.

"Storing profiling information for use in future virtual machine invokations for optimization decisions", Authors et al.: Disclosed Anonymously, An IP.com Prior Art Database Technical Disclosure, IP.com No. 000216308, IP.com Electronic Publication: Mar. 29, 2012, pp. 1-5.

* cited by examiner

```
1    public String methodA() {
2      String s = methodB();
3      methodX();
4      methodY();
5      return s;
6    }
7
8    public String methodB() {
9      methodZ();
10     return methodC();
11   }
12
13   public String methodC() {
14     return "HelloWorld";
15   }
16
17   public String methodX() {
18     return "X";
19   }
20
21   public String methodY() {
22     return "Y";
23   }
24
25   public String methodZ() {
26     return "Z";
27   }
```

1. methodB() --> methodC() : line 10 // methodC is brought in-line with methodA
2. methodA() --> methodB() : line 2 // methodB is brought in-line with methodA

AUGMENTING PROFILE DATA WITH INFORMATION GATHERED FROM A JIT COMPILER

BACKGROUND

The present invention relates to Just-in-Time (JIT) compilers, and more particularly to providing performance profile data for JIT compilers.

Performance profiling tools for Java code are very powerful and useful for improving application performance and resolving performance defects (Java is a trademark of Oracle Inc.). If a detailed breakdown of the application run-time, call paths and associated costs is wanted then the Java Virtual Machine (JVM) can be instrumented so that cycle/instruction data (for instance) for every method, the call paths and the invocation counts can be received. This is extremely powerful and provides in-depth data on the application run-time to assist performance analysts.

BRIEF SUMMARY OF THE INVENTION

A method, executed by a computer, for augmenting a first performance profile with data extracted from a Just-in-Time compiler, the Just-in-Time compiler compiling bytecodes into machine instructions and generating the first performance profile, the bytecodes having an associated original call structure includes: tracking "in-lining" optimizations performed by a Just-in-Time compiler compiling bytecodes into machine instructions; extracting data associated with the tracked "in-lining" optimizations; storing the extracted data in a second profile; and augmenting the first performance profile with the extracted data associated with the tracked "in-lining" optimizations, the extracted data comprising call paths corresponding to the original call structure associated with the bytecodes. A corresponding computer program product and computer system are also disclosed herein.

BRIEF DESCRIPTION OF THE DRAWINGS

Preferred embodiments of the present invention will now be described in more detail, by way of example only, with reference to the accompanying drawings, in which.

DETAILED DESCRIPTION OF THE EMBODIMENTS

Figures 1A, 1B:
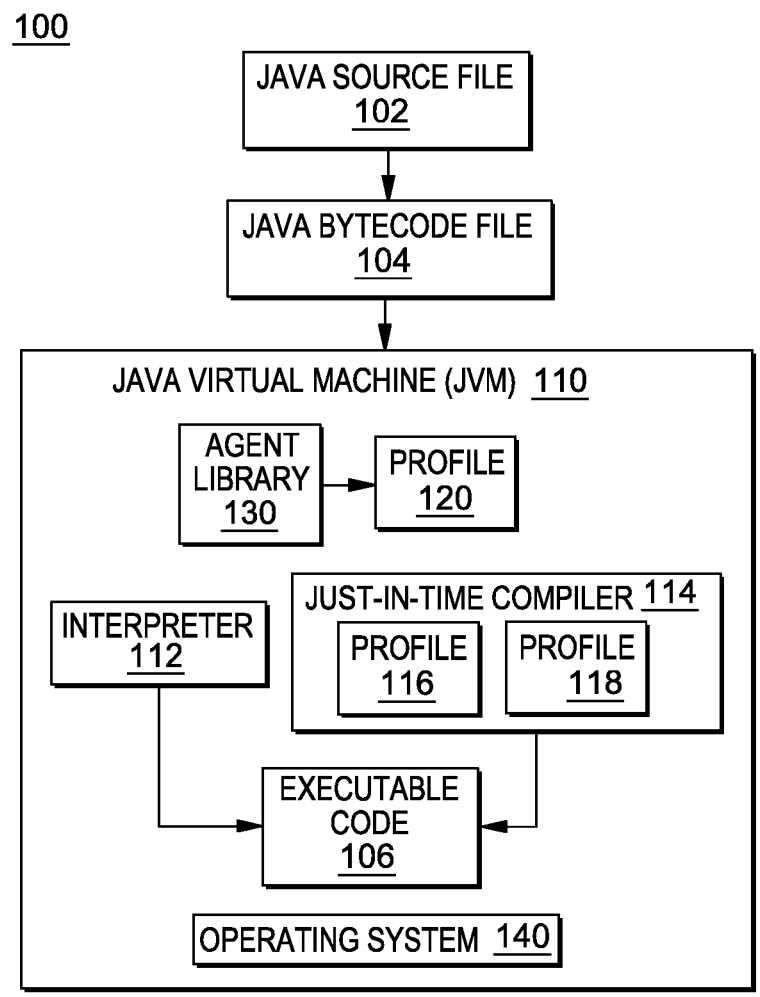
FIG. 1A depicts one example of source code.
FIG. 1B is a block diagram depicting one example of a Java Virtual Machine (JVM) including an interpreter, JIT compiler, agent library and its associated profile and executable code.

The analysis of this prior art cycle/instruction data is often complicated by an optimization performed by the JIT compiler called "in-lining". In-lining is the process of replacing a subroutine or function call at the call site with the body of the subroutine or function being called. Advantages of using in-lining include the elimination of call-linkage overhead and the exposure of significant optimization opportunities. For example, with in-lining, an optimizer within the JIT compiler can replace the subroutine parameters in the function body with the actual arguments passed. Disadvantages of using in-lining include code bloat and an increase in the difficulty of debugging source code. In-lining essentially shortcuts method calls and brings additional invocations "in-line". FIG. 1A depicts an example of in-lining.

In the depicted example it would be expected that the call graph shows methodA( )→methodB( )→methodC( ). However, with "in-lining" the call graph at runtime could potentially be methodA( )→methodC( ). This optimization causes problems when trying to profile Java code and reference the source code of the application. The call graph for the optimized code shows methodA( ) calling methodC( ) but methodA( ) doesn't call methodC( ) in the source code so it is difficult to trace the call paths.

A prior art solution to this problem is to profile the run-time application with JIT compiler "in-lining" disabled, but this causes the application to behave differently and is not a realistic representation that performance analysis can be based on. At least some of the embodiments of the present invention address these issues.

FIG. 1B shows a system 100 having a Java source file 102 which is converted to a Java bytecode file 104. The Java bytecode file 104 is received by a Java Virtual Machine (JVM) 110. The JVM 110 comprises an interpreter 112 and a Just-in-Time (JIT) compiler 114.

The JVM 110 uses Interpreter 112 and JIT compiler 114 to convert the received bytecodes in the Java bytecode file 104 into executable code 106. The executable code 106 typically includes native operating system 140, calls and machine instructions for execution on the underlying platform. The interpreter 112 may translate methods represented by bytecodes in Java bytecode file 104 into native machine instructions each time the bytecodes are executed. Alternatively, the JIT compiler 114 compiles methods represented by bytecodes in Java bytecode file 104 into native machine instructions. When the methods are invoked a second or subsequent time, the compiled native machine instructions may be executed without the need to translate the bytecodes again. A JVM 110 may be configured so that less frequently invoked or less computationally intense methods are interpreted by the interpreter 112. Other methods, such as more frequently invoked or more computationally intense methods are compiled by the JIT compiler 114. The executable code 106 may contain portions which are interpreted by the interpreter 112 and portions compiled by the JIT compiler 114.

The Just-in-Time (JIT) compiler 114 includes profiler 116, which generates a first performance profile 118. In order to optimize the compiled native machine instructions generated by the JIT compiler 114, it can be advantageous to use method invocation counts to drive compiler optimizations along with additional analysis which may be guided by runtime execution. The data generated may include, for example, call targets for virtual calls, branch taken/not-taken frequencies, array sizes and call path information which can be used to optimize the compiled native machine instructions. The optimizations may include local optimizations, control flow optimizations and global optimizations. Local optimizations analyze and improve a small section of the code at a time. Control flow optimizations analyze the flow of control inside a method (or specific sections of it) and rearrange code paths to improve their efficiency. Global optimizations work on the entire method at once. They are more "expensive", requiring larger amounts of compilation time, but can provide a great increase in performance. The platform may comprise hardware and an operating system 140.

If the executable code 106, that is both the compiled bytecode and the interpreted bytecode, is to be profiled, typically performance profiling, then an agent library 130 is loaded into the JVM 110. The agent library 130 generates a second profile 120 typically containing performance related metrics. Second profile 120 will be further described with reference to FIG. 2.

Analysis of the application profile (202 in Figure), described below with reference to FIG. 2, can be difficult, and can be complicated by an optimization performed by the JIT compiler 114 called "in-lining" This is especially true when attempting to cross-reference call paths to the Java source file 102. As described above, "in-lining" essentially shortcuts method calls and brings additional invocation "in-line".

For example, some example source code is shown in FIG. 1A. In this simple example it would be expected that the call graph show methodA( )→methodB( )→methodC( ), however, with "in-lining" the call graph at run-time could potentially be methodA( )→methodC( ). A more complicated example is shown in FIG. 1C. The line numbers shown in FIG. 1C are included for the purpose of explanation of the optimization tracking data referred to below.

Figures 1C, 2:
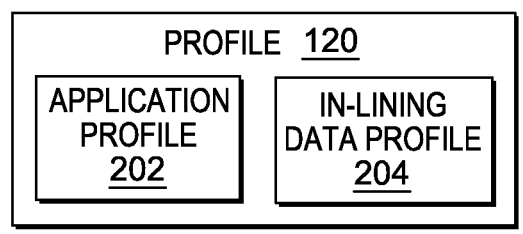
FIG. 1C depicts another example of source code.
FIG. 2 is a block diagram depicting one embodiment of the profile associated with the agent library of FIG. 1.

Referring to FIG. 2, a block diagram of the second profile 120 associated with the agent library 130 of FIG. 1B is shown. The second profile 120 comprises application profile 202 whose content is similar to first performance profile 118 except that the scope of the profiling includes both interpreted and compiled bytecodes. Embodiments of the present invention further comprise an inlining data profile 204 which has additional information associated with calls which have been "in-lined".

Embodiments of the present invention "fill in the gaps" to enable performance analysts to more effectively and efficiently use the profile 120 to analyze the application and cross-reference the Java source file 102. The profile 120 is generated based on the in-lined optimized code. Embodiments of the present invention also enable a performance analyst to gain a better understanding of how effectively the JIT compiler 114 has been able to optimize the Java source file 102. Filling in the gaps enables a performance analyst to more effectively and efficiently analyze the application and cross-reference the Java source file 102.

Figures 3A, 3B:
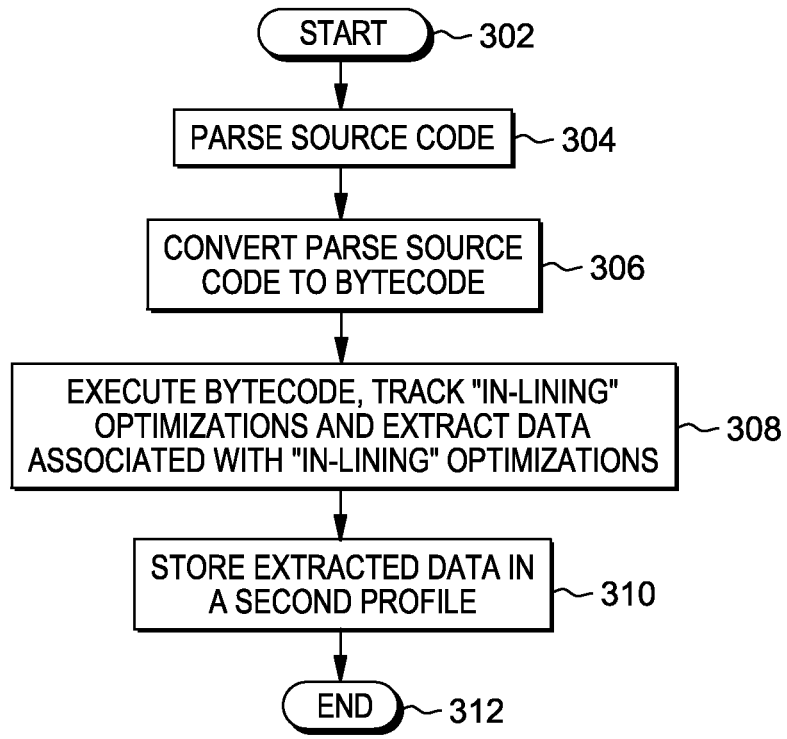
FIG. 3A is a flow chart depicting one embodiment of a profile generation method in accordance with the present invention; of profile information associated with the agent library of FIG. 1.
FIG. 3B depicts one example of an inline data profile.

Referring to FIG. 3A, an embodiment of a method according to the present invention of the generation of profile information 120 associated with the agent library 130 of FIG. 1B starts at operation 302. At operation 304, a Java source file 102 is parsed so as to check for the correct syntax of the Java source file 102. Additionally, the parsing operation may, optionally, produce a parse tree, syntax tree or other structure giving a structural representation of the input. The source file is not limited to being a Java source file, but may, for example, be LISP, Microsoft's .NET framework, Smalltalk, Python, PHP, Tcl or any other source code which may be processed with a JIT compiler that carries out such performance optimizations as described above. At operation 306, the parsed Java source file 102 is converted to a Java bytecode file 104. In an embodiment operations 304 and 306 may be combined in one operation.

At operation 308, the bytecode is executed and the agent library 130 generates second profile 120 associated with the Java bytecode by tracking "in-lining" optimizations and extracting data associated with the tracked "in-lining" optimizations. As explained above with reference to FIG. 1B, the operation of executing bytecodes in Java bytecode file 104 may include compilation by the JIT compiler 114 of methods represented by bytecodes in Java bytecode file 104 into native machine instructions. During the operation of compilation of methods represented by bytecodes in Java bytecode file 104, the JIT compiler 114 may perform optimizations of the output native machine instructions. These optimizations include generating call targets for virtual calls, branch taken/not-taken frequencies, array sizes and call path information as described briefly above with reference to FIG. 1B. Conventionally, such performance profile information may include for each method or each call, the number of CPU cycles, the number of instructions executed, the proportion of time spent in the method or the number of memory bytes allocated or any number of other metrics. In embodiments of the present invention, in addition to the conventional performance profile information 118, information 120 concerning optimizations performed including the in-lining of invocations of methods is generated by the agent library 130. In a preferred embodiment, the agent library 130 loaded into the JIT compiler 114 in the JVM 110 is instructed to keep track of optimizations the JIT compiler 114 is performing when it is started. When conventional application profile data 202 is collected this in-lining data profile 204 will be extracted and stored alongside the application profile 202 in the second profile 120. For example, the JVM 110 may track when a particular method is brought in-line and the order/sequence in which the in-lining has occurred. For example, with the code shown in FIG. 1C the in-lining data profile would be similar to the profile shown in FIG. 3B.

Additionally, information in order to identify the point in the method a particular call is made from is collected so as to ensure accuracy in the final output. At operation 310, the extracted data is stored in a second profile 204. The second profile 120 includes conventional application profile 202 and in-lining data profile 204 generated according to embodiments of the present invention. The method ends at operation 312.

Once the order and details are known this information from the in-lining data profile 204 can be applied in the reverse order to the conventional application profile 202 to augment the profile 120 with the invocations that were brought in-line and make the profiled call paths more applicable to the originating code base call structure, such as the Java source file 102.

In an embodiment a simple toggle is used to switch this function on and off so that an analyst can move between the run-time call structure and the source call structure depending on whether the analyst is cross-referencing data with the source repository or identifying more general "hot-spots".

Figure 4:
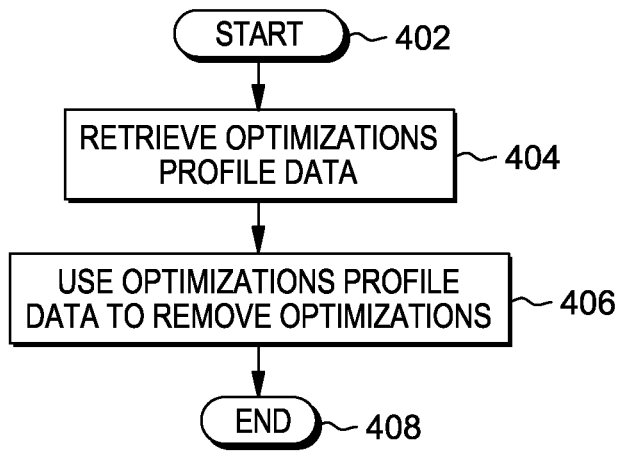
FIG. 4 is a flow chart depicting a first embodiment of a profile utilization method in accordance with the present invention.

Referring to FIG. 4 a first embodiment of a method of post-processing the generated in-lining data profile 204 is shown. The method starts at operation 402. At operation 404, the optimizations stored in in-lining data profile 204 from the JIT compiler 114 are retrieved. In the example above, this indicates that methodC( ) is brought in-line with methodA( ) at line 10 and that methodB( ) is brought in-line with methodA( ) at line 2. At operation 406, the in-lining data profile 204 is used to remove optimizations for the purposes of use with a performance profiling tool. The optimizations are not removed from the code which is executed. The optimizations are removed for the purposes of use with a performance profiling tool to allow a detailed breakdown of the application run-time, call paths and associated costs to be obtained using correct references to the Java source code file 102 of the application.

Figure 5:
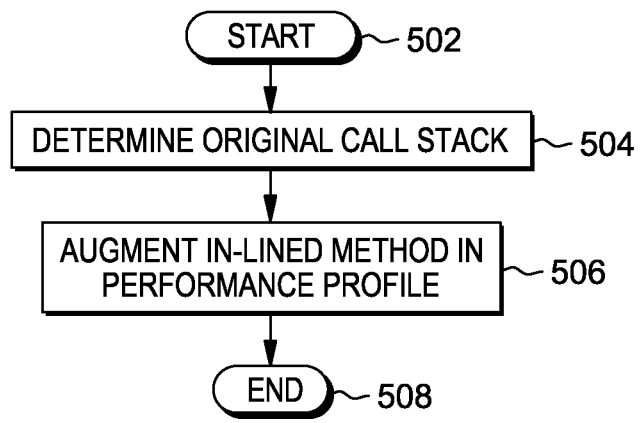
FIG. 5 is a flow chart depicting a first embodiment of a profile utilization method in accordance with the present invention.

Referring to FIG. 5, a second embodiment utilizing the generated in-lining data profile 204 at runtime is shown. The method starts at operation 502. At operation 504, the original call graph is determined using a conventional mechanism for processing exceptions, such as the mechanisms that are used when an exception is created by the JVM 110. At operation 506, the first performance profile 120 is augmented with the information 204 about the methods which were in-lined by the JIT compiler 114. This enables the performance profiling tool to differentiate between, for example, a call from methodA( ) to methodC( ) and a call from methodA( ) to methodC( ) with an in-line reference to methodB( ). The differentiation allows the performance profiling tool to construct the appropriate trees corresponding to the method calls and for the user to switch between viewing the original call graphs in order to compare these with the Java source file 102 and the optimized call graphs.

Although the embodiments above have been described with reference to a Java Virtual Machine 110, Java source file 102 and Java bytecode 104, the person skilled in the art will realize that embodiments of the present invention may also be used with other programming languages, such as LISP, Microsoft's .NET framework, Smalltalk, Python, PHP or Tcl.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, executed by a computer, for augmenting a first performance profile with data extracted from a Just-in-Time compiler, the Just-in-Time compiler compiling bytecodes into machine instructions and generating the first performance profile, the bytecodes having an associated original call structure, the method comprising:
   tracking "in-lining" optimizations that collapse the associated original call structure as performed by a Just-in-Time compiler compiling bytecodes into machine instructions;
   extracting data associated with the tracked "in-lining" optimizations that collapse the associated original call structure to provide extracted data that specifies functions within the associated original call structure that are collapsed by the tracked "in-lining" optimizations;
   storing the extracted data that specifies functions within the associated original call structure that are collapsed by the tracked "in-lining" optimizations in a second performance profile; and
   augmenting the first performance profile with the extracted data that specifies functions within the associated original call structure that are collapsed by the tracked "in-lining" optimizations.

2. The method of claim 1, wherein the Just-in-Time compiler is instructed to track "in-lining" optimizations when it is started.

3. The method of claim 1, wherein the bytecodes comprise calling methods and called methods and the extracted data comprises identifications of called methods brought "in-line" and identifications of a point in a calling method at which a called method is called.

4. The method of claim 1, wherein said operation of augmenting the first performance profile is carried out by post-processing the first performance profile.

5. The method of claim 1, wherein:
   the Just-in-Time compiler executes within a virtual machine; and
   said operation of augmenting the first performance profile is carried out at runtime and comprises the operations of:
   determining the associated original call structure of the bytecodes; and
   augmenting the first performance profile with information associated with any methods which were "in-lined".

6. The method of claim 1, wherein said operations of tracking "in-lining" optimizations and extracting data are carried out by an agent library.

7. A computer program product for augmenting a first performance profile with data extracted from a Just-in-Time compiler, the Just-in-Time compiler compiling bytecodes into machine instructions and generating the first performance profile, the bytecodes having an associated original call structure, the computer program product comprising: one or more computer readable storage media and program instructions stored on the one or more computer readable storage media, the program instructions comprising instructions to:
   track "in-lining" optimizations that collapse the associated original call structure as performed by a Just-in-Time compiler compiling bytecodes into machine instructions;
   extract data associated with the tracked "in-lining" optimizations that collapse the associated original call structure to provide extracted data that specifies functions within the associated original call structure that are collapsed by the tracked "in-lining" optimizations;
   store the extracted data that specifies functions within the associated original call structure that are collapsed by the tracked "in-lining" optimizations in a second performance profile; and
   augment the first performance profile with the extracted data that specifies functions within the associated original call structure that are collapsed by the tracked "in-lining" optimizations.

8. The computer program product of claim 7, wherein the Just-in-Time compiler tracks "in-lining" optimizations when it is started.

9. The computer program product of claim 7, wherein the bytecodes comprise calling methods and called methods and the extracted data comprises identifications of called methods brought "in-line" and identifications of a point in a calling method at which a called method is called.

10. The computer program product of claim 7, wherein the instructions to augment the first performance profile are carried out by post-processing the first performance profile.

11. The computer program product of claim 7, wherein:
    the Just-in-Time compiler executes within a virtual machine; and
    the instructions to augment the first performance profile are carried out at runtime and comprise instructions to:
    determine the associated original call structure of the bytecodes; and
    augment the first performance profile with information associated with any methods which were "in-lined".

12. The computer program product of claim 7, wherein the instructions to track "in-lining" optimizations and extract data are carried out by an agent library.

13. A computer system for augmenting a first performance profile with data extracted from a Just-in-Time compiler, the Just-in-Time compiler compiling bytecodes into machine instructions and generating the first performance profile, the bytecodes having an associated original call structure, the computer system comprising:
    one or more computers;
    one or more computer readable storage media and program instructions stored on the one or more computer readable storage media for execution by at least one of the one or more computers, the program instructions comprising instructions to:
    track "in-lining" optimizations that collapse the associated original call structure as performed by a Just-in-Time compiler compiling bytecodes into machine instructions;
    extract data associated with the tracked "in-lining" optimizations that collapse the associated original call structure to provide extracted data that specifies functions within the associated original call structure that are collapsed by the tracked "in-lining" optimizations;

store the extracted data that specifies functions within the associated original call structure that are collapsed by the tracked "in-lining" optimizations in a second performance profile; and augment the first performance profile with the extracted data that specifies functions within the associated original call structure that are collapsed by the tracked "in-lining" optimizations.

14. The computer system of claim 13, wherein the Just-in-Time compiler tracks "in-lining" optimizations when it is started.

15. The computer system of claim 13, wherein the bytecodes comprise calling methods and called methods and the extracted data comprises identifications of called methods brought "in-line" and identifications of a point in a calling method at which a called method is called.

16. The computer system of claim 13, wherein the instructions to augment the first performance profile are carried out by post-processing the first performance profile.

17. The computer system of claim 13, wherein:
the Just-in-Time compiler executes within a virtual machine; and
the instructions to augment the first performance profile are carried out at runtime and comprise instructions to:
determine the associated original call structure of the bytecodes; and
augment the first performance profile with information associated with any methods which were "in-lined".

18. The computer system of claim 13, wherein the instructions to track "in-lining" optimizations and extract data are carried out by an agent library.

\* \* \* \* \*